UNITED STATES PATENT OFFICE.

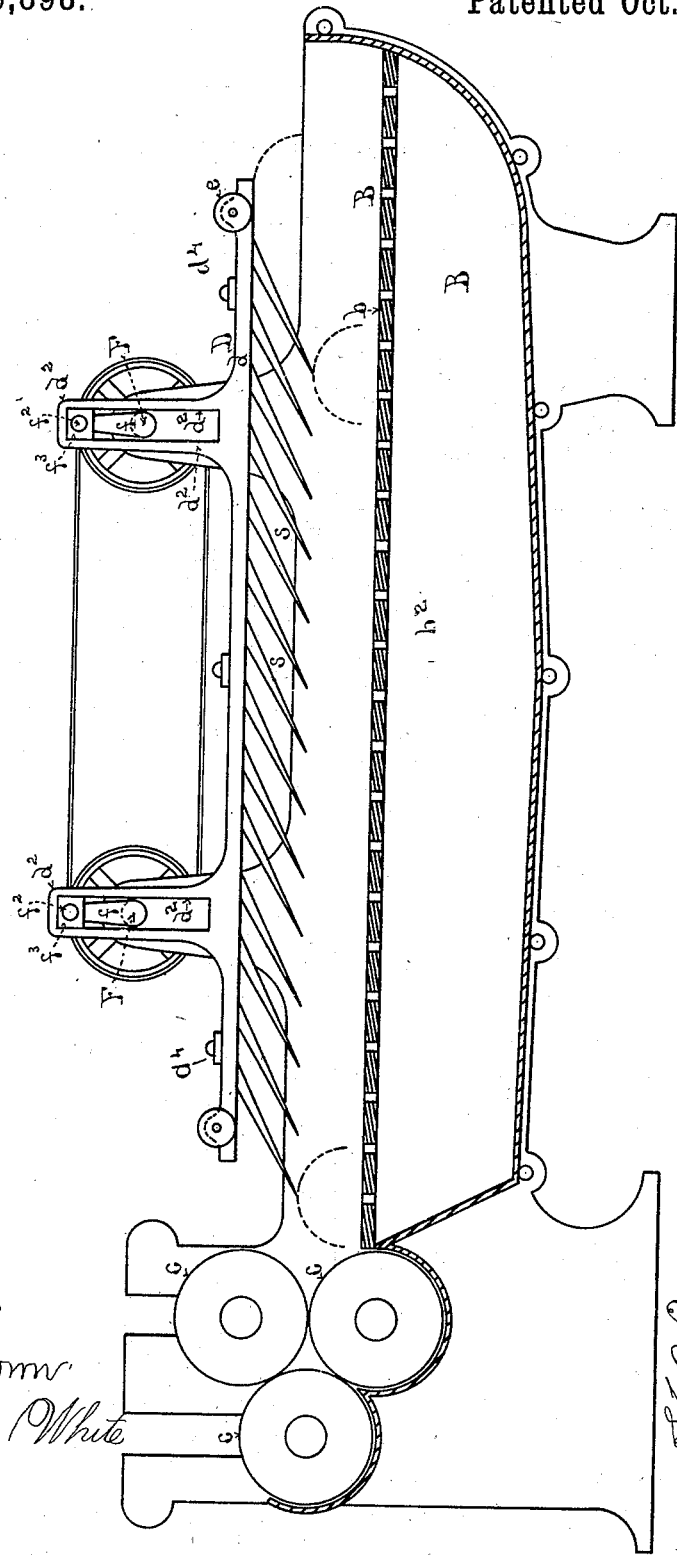

FREDERICK G. SARGENT AND ALLAN C. SARGENT, OF GRANITEVILLE, MASS.

WOOL-WASHING MACHINE.

SPECIFICATION forming part of Letters Patent No. 266,898, dated October 31, 1882.

Application filed June 13, 1881. (No model.)

*To all whom it may concern:*

Be it known that we, FREDERICK G. SARGENT and ALLAN C. SARGENT, of Graniteville, in the county of Middlesex and State of Massachusetts, have invented a new and useful Wool-Washing Machine, of which the following is a specification.

Our invention relates to machines in which a scouring or cleansing fluid is placed in a tank or bowl, into which the wool is placed, and in which it is stirred or agitated by a mechanism, provided for that purpose; and the objects of our invention are to provide a rake mechanism, formed of a single frame, which will agitate and move the wool through substantially the entire length of the bowl without the aid of other mechanism, and to provide a machine which shall have a settling and supply reservoir. We accomplish this result by the mechanism illustrated in the accompanying drawing, in which the figure is a longitudinal elevation with the side of the machine removed to show the working mechanism.

B is the bowl into which the scouring-liquor is placed.

$b$ is a perforated diaphragm or false bottom, to sustain the wool near the surface of the liquid in the tank.

C C are the squeeze-rolls.

D is the rake, composed of longitudinal side bars, $d$ $d$, which are provided with slotted posts $d^2$, and inner longitudinal bars connected to the side bars by cross-bars $d^4$. The longitudinal and cross bars, being rigidly attached to one another, form a rake structure, all of whose parts move together when in operation. The side bars, $d$, are provided with the trucks or rollers $e$. The rake D is moved by the crank-shafts F F, which are provided with cranks $f f$, having crank-pins $f^2 f^2$, which support sliding boxes $f^3$. The sliding boxes $f^3$ move in the slots of the posts $d^2$, and the slots in the posts are of such length that the sliding boxes will come into contact with the upper ends of the slots as the crank-pins rise above the level of the crank-shafts, thereby lifting the rake and carrying it during the time the cranks are making the upper half of their rotation. As the trucks $e$ are so placed as to come into contact with the edge of the bowl, the rake D will be sustained by them when the cranks make the lower half of their revolution, and the rake D will only be moved forward parallel with the edge of the bowl upon which the trucks move until again lifted by the slide-boxes brought up by the crank-pins coming above the level of the crank-shaft as they rotate.

The crank-shafts are driven by any convenient method and are made to move at the same rate by one being driven from the other by a belt, as shown, or by a shaft provided with gear-wheels, which engage with others placed on the crank-shafts.

The rake-bars $d$ $d$ are provided with teeth or tines $s$ $s$, attached so as to project downward and forward at such an angle as to permit of the wool sliding off from them as the rake is lifted upward and backward, thereby preventing a backward impulse being given to it as the rake makes its backward movement and preventing its being carried back with the rake-tines as they are carried back over the wool in the fluid.

When the rake-teeth rise above the fluid-level, however, they raise the wool above the washing-fluid before it slides off them; and this is accomplished, as well as the effect of having no backward movement given to the wool in the fluid below and behind the teeth as they rise, by having the forward inclination of the teeth form the perpendicular, at least as great or greater than the chord of the semi-arc described by the cranks $f^2$ while lifting the carrier to its highest altitude—that is, if the arc described by either of these cranks be taken from the instant it begins to lift the carrier until it reaches its highest point of lift and just before it begins to lower the carrier, the chord of this arc will be at as little or less inclination from a line dropped from its upper end through the center, about which it is described, as the inclination of the rake-teeth thereto. Without such inclination of the rake-teeth it is evident that they would not only not lift the wool effectively and certainly from the liquid before it slid off them, but also that they would give a backward motion to the wool behind them, and thus partly or wholly neutralize the effect of their forward movement. The effect of lifting the wool and causing it to slide off these teeth is not only to add materially to its forward movement toward the squeeze-rolls in the liquid, but also to stir it up therein, and so wash it more thoroughly, and the false bottom prevents it from plunging downward into the liquor so far as to stir up the dirt previously settled to the bottom of the bowl when it slides off the teeth.

As the false bottom is placed sufficiently near the surface to partially sustain the wool saturated in the bowl, the wool, when the rake moves it forward, will carry with it the fluid above the false bottom, which finds its readiest means of escape through the openings in the bottom into the body of the bowl, while other portions of the scouring-liquid will rise up through the openings in the false bottom behind the masses of wool to maintain the fluid level.

The perforated bottom $b$ is so placed with reference to the squeeze-rolls C C that it is somewhat above the level of the axis of the lower roll, in order to facilitate the action of our peculiar carrier, in combination with it in delivering the wool to the nip of the squeeze-rolls. It is also so placed with reference to the rising and falling movement of the carrier D that it keeps the wool resting upon it within positive range of the action of the carrier-teeth as they descend and move toward the squeeze-rolls. While these features of construction are not absolutely necessary to the operation of the peculiarly-inclined carrier-teeth, it is evident that they greatly facilitate it.

The body of the bowl being below the false bottom, the fluid it contains will be beyond the reach of the violent agitation caused by the movement of the rake or wool moved by it, and will therefore quickly loose the heavier particles of foreign matter washed from the wool by their falling to the bottom before the fluid rises up through the holes in the false bottom for the saturation of the wool being fed to the machine. Such purification of the liquor is not possible in a bowl in which the larger portion of the fluid is kept stirred and agitated by the washing mechanism moving in it, because such agitation will keep all parts of the fluid so disturbed that foreign matter, unless greatly heavier than the fluid, will be kept suspended during the entire time the machine is in operation, while in the device, as shown, the part marked $b^2$ acts as a supply and settling reservoir, through which the fluid being used constantly passes, and in which it is considerably purified by the settling of the heavier particles, as described.

As the rake descends after being carried up and back by the cranks, it will bring its tines into contact with the wool while still moving downward and backward, and therefore the tines will, before entering the wool, bear it down into the fluid, after which the forward movement will be begun and the tines will be pushed into the wool, and it will be lifted somewhat as it is drawn forward by sliding up upon the tines.

With a rake consisting of a frame extending substantially the whole length of that part of the bowl used for washing the wool and provided with thickly-set teeth or tines, the wool may be opened out upon the feed-table preparatory to being fed to the machine, and when fed in in such spread-out and sheet-like form, as is a fleece when unrolled, will be operated upon by the rake without being by such operation bunched or massed together, as is the case when a considerable quantity is acted upon by a rake having but a single rank or set of teeth, which crowd behind the mass and force it through the liquid in the tank. It will therefore, by reason of its being presented to the action of the scouring-fluid in such spread-out and opened form, during its entire passage through the scouring-liquid, be more thoroughly cleansed, and will as it passes to the squeeze-rolls be more quickly and readily taken by them than when presented in masses of greater thickness.

It will be observed that we have dispensed with all mechanism, either fixed or moving, to be contained or worked within the bowl other than the rake itself, and have by the construction shown obviated the necessity of having any fixed teeth, stops, or gratings to prevent a backward movement of the wool, and have therefore produced a machine of simple form and cheap construction.

We do not intend to limit our device to a combination of lifting-cranks only with the rake, as any equivalent lifting mechanism which raises the rake in an upward and backward direction on an angle of inclination somewhat more perpendicular than that of the teeth will manifestly accomplish the same result when the latter are inclined to said perpendicular at least forty-five degrees, as shown.

What we claim as new and of our invention is—

In combination with the bowl B and cranks $f^2$, the carrier D, provided with teeth inclined forward at as great or greater angle from the perpendicular than the chord of the semi-arc described by the carrier-moving cranks $f^2$ while moving the carrier upward and backward, substantially as described.

FREDERICK GRANDISON SARGENT.
   ALLAN C. SARGENT.

Witnesses:
 ARTHUR B. PLIMPTON,
 H. W. CHURCH.